Feb. 18, 1930. F. B. BLACKMAN 1,748,034
DUPLEX EXTENSION MIRROR
Filed Jan. 31, 1928
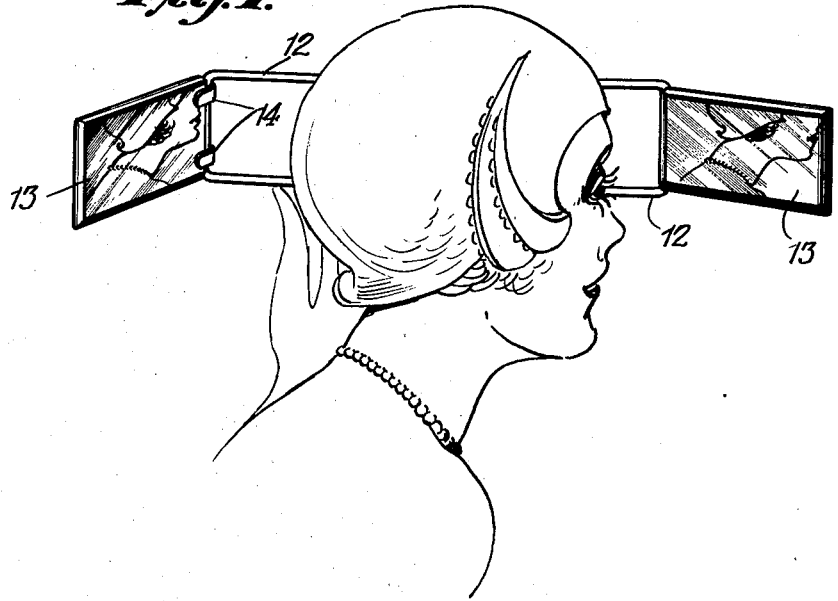
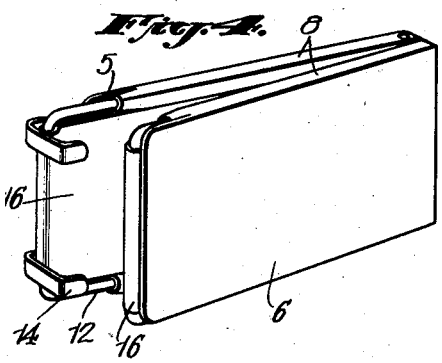
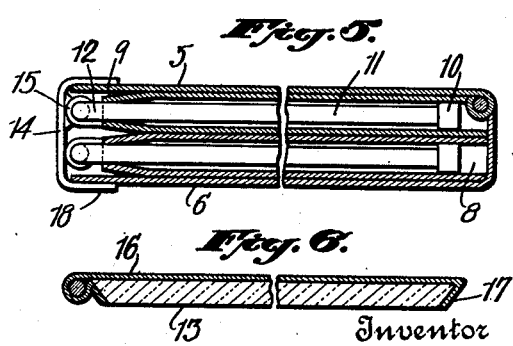
Inventor
FREDERICK B. BLACKMAN.
By His Attorney Patented Feb. 18, 1930

1,748,034

UNITED STATES PATENT OFFICE

FREDERICK B. BLACKMAN, OF BROOKLYN, NEW YORK; ROSA E. BLACKMAN EXECUTRIX OF SAID FREDERICK B. BLACKMAN, DECEASED

DUPLEX EXTENSION MIRROR

Application filed January 31, 1928. Serial No. 250,912.

This invention relates to a duplex extension mirror and in particular to one which can be arranged to observe the back of the head by extension of the parts thereof.

A particular object of my invention is to provide a mirror of duplex nature which, after having been fully extended and used for the purpose desired, can be closed up and subsequently folded to very compact space and within a casing which would permit the same to be carried in a lady's handbag, for instance, for convenient use.

A still further object of the invention is to provide a plurality of casings in which are supported slide members, the slide members, in turn, carrying mirrors, these mirrors being so arranged that, through their pivotal and extendable relation, they can be arranged so that one may view the back of one's head without the use of a plurality of mirrors or without turning the head.

A still further object of the invention is to provide a casing in which the mirrors can be folded and stored when not in use so that breakage thereof will be prevented.

To enable others skilled in the art to fully comprehend the underlying features of my invention that they may embody the same in the various modifications in structure and relation contemplated, a drawing depicting a preferred form has been annexed as a part of this disclosure and in such drawings, similar reference characters denote corresponding parts throughout all the views, of which, Figure 1 is a view in perspective showing how my improved duplex extension mirror can be used to view the back of the head.

Figure 2 is a view in front elevation of my device, the same being shown fully extended for use.

Figure 3 is a top plan view of my duplex extension mirror as illustrated in Figure 2.

Figure 4 is a view in perspective showing how the casing can be folded up flat after the slides and mirrors have been positioned therein.

Figure 5 is a longitudinal, cross-sectional view taken through the device and showing how the slide members are supported in the tubular-like edges of the casing, this view also showing the arrangement of the catches on one end of one of the slides for locking the casings together when not in use, and Figure 6 is an enlarged section taken on the line 6—6 of Figure 2.

Referring to the drawings in detail, 5 and 6 indicates the casings or receptacles which are hinged together in the usual manner as at 7, each of the casings being provided along their longitudinal edges with square tubular receptacles 8, the outer ends 9 thereof being constricted as indicated in Figure 5 to imprison the enlarged end 10 of the legs 11 of the slide members 12. These slide members and their respective mirrors 13 are substantially the same in both halves of the device, it being understood that the side of the casing 6 is arranged to receive the slides 12 to the outer end of which is pivotally secured, the mirrors 13, this being also true of the casing member 5 so that both mirrors can be folded into the casings 5 and 6 when the slides have been moved inwardly of the casings as illustrated in Figure 4. The mirror 13 that is arranged to rest in the casing 5 is provided with spaced clips 14, these being soldered or otherwise secured by the metal loops 15 formed on the ends of the mirror base 16. This mirror base is made of metal and the mirror 13 itself is secured in place thereon by the up-turned edges 17 of said mirror base.

It will be noted in Figure 5 that one side of the clips 14 are longer than the other side so that the extended ends 18 thereof can engage the outer surface of the casings 5 and 6 to effectively hold the same in closed position.

The construction is such that the slide members 12 are pushed into the casings 5 and 6 and the mirrors 13 are revolved about the ends of the slides 12 until they rest within the casings 5 and 6, at which time the slides can be further projected into the casings 5 and 6 until the clips 14 at one side of the device slip over the outer surfaces of the casings 5 and 6 to effectively secure the same together.

It is evident with this construction that my duplex extension hand mirror can be carried in a lady's handbag or in the pocket and can be effectively used to inspect the back of the head of the user.

It is also evident that in a mirror of this type inspection of remote parts of machinery or other articles may be made which could not be made otherwise and it is quite evident that the angular relation of the mirrors 13 permit them to be so positioned that any point at the back of the head of the user may be viewed.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A duplex extension mirror comprising hinged casing members having tubular edges, slides arranged in said edges, and mirrors pivotally carried by said slides.

2. A duplex extension mirror comprising hinged casing members, tubular guides on the edges of said casing arranged to form therebetween mirror receptacles, mirror carriers having extensions slidably arranged in said guides, means on the extensions for preventing complete withdrawal from the guides, and mirrors pivotally secured to the carriers.

3. A duplex extension mirror comprising hinged casings, tubular guides disposed on the edges of said casings and arranged to form therebetween mirror receptacles, mirror carriers having extensions slidably arranged in said guides, means on the extensions for preventing complete withdrawal from the guides, mirrors pivotally secured to the carriers and arranged to be positioned in the casings when said carriers are moved into said guides and a catch carried by one of the mirrors for engaging the casings when the mirrors are positioned therein to retain the casings in closed position.

In testimony whereof I affix my signature.

FREDERICK B. BLACKMAN. [L. S.]